US012621349B2

(12) United States Patent
Paulraj

(10) Patent No.: US 12,621,349 B2
(45) Date of Patent: May 5, 2026

(54) DYNAMIC UNLOCKING OF SOFTWARE DEFINED SILICON (SDSi) PROCESSOR FEATURES VIA SECURITY PROTOCOL DATA MODEL (SPDM)

(71) Applicant: Dell Products, L.P., Round Rock, TX (US)

(72) Inventor: Deepaganesh Paulraj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 563 days.

(21) Appl. No.: 18/176,791

(22) Filed: Mar. 1, 2023

(65) Prior Publication Data

US 2024/0297901 A1 Sep. 5, 2024

(51) Int. Cl.
H04L 29/00 (2006.01)
H04L 9/40 (2022.01)

(52) U.S. Cl.
CPC .......... H04L 63/20 (2013.01); H04L 63/0823 (2013.01)

(58) Field of Classification Search
CPC .................... H04L 63/0876; H04L 63/0823
See application file for complete search history.

(56) References Cited

U.S. PATENT DOCUMENTS

| | | | |
|---|---|---|---|
| 2021/0011741 A1* | 1/2021 | Bartfai-Walcott | .... H04L 9/3268 |
| 2021/0367974 A1* | 11/2021 | Ponnuru | ............. H04L 63/0823 |
| 2022/0124118 A1* | 4/2022 | Bangalore Sathyanarayana | ......... H04L 63/1416 |
| 2022/0292203 A1* | 9/2022 | Severns-Williams | ........................ G06F 21/57 |

* cited by examiner

*Primary Examiner* — Jeffrey C Pwu
*Assistant Examiner* — Helai Salehi
(74) *Attorney, Agent, or Firm* — Fogarty LLP

(57) ABSTRACT

In one embodiment, an Information Handling System (IHS), comprises an SPDM-enabled device conforming to a SPDM specification. The SPDM-enabled device causes the IHS to identify a device in the IHS having optional hardware features, provision activation data for the optional hardware features, and activate the optional hardware features by sending SPDM messages to the device. The IHS comprises a host processor module configured to host one or more processors, a secure control module configured to host a baseboard management controller, and a secure control interface configured to support communication between the secure control module and the host processor module. The one or more processors have optional hardware features. The one or more processors may be Software Defined Silicon (SDSi) devices. The baseboard management controller identifies the device having optional hardware features using a SPDM GET_CERTIFICATE request message sent to the devices.

18 Claims, 4 Drawing Sheets

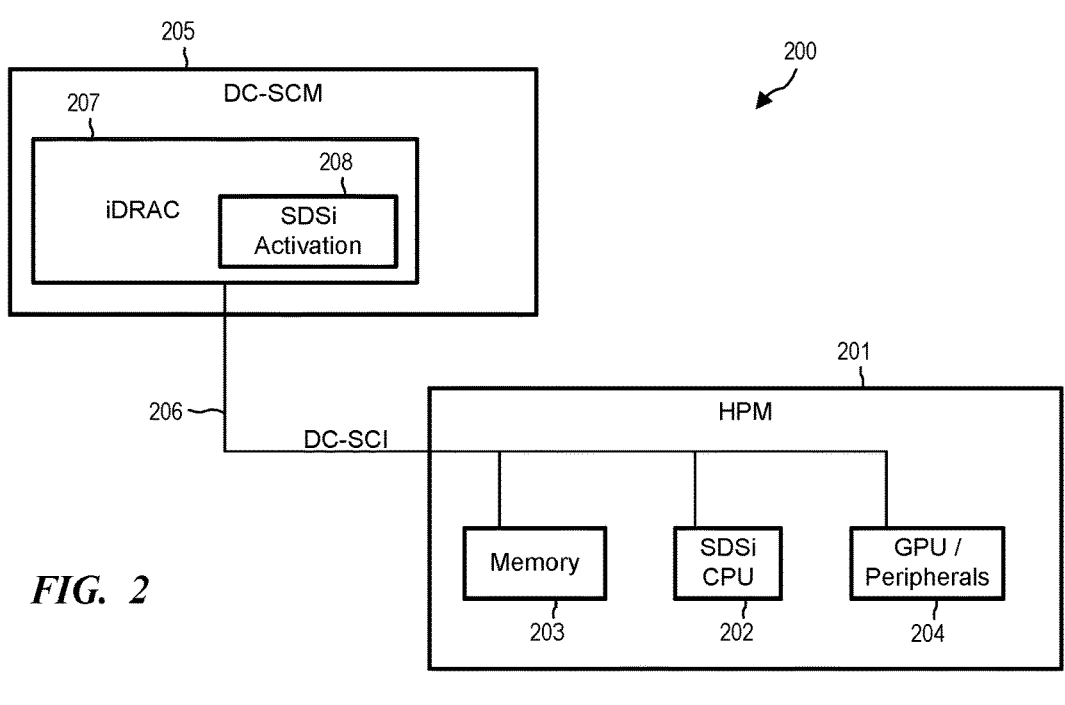

FIG. 2

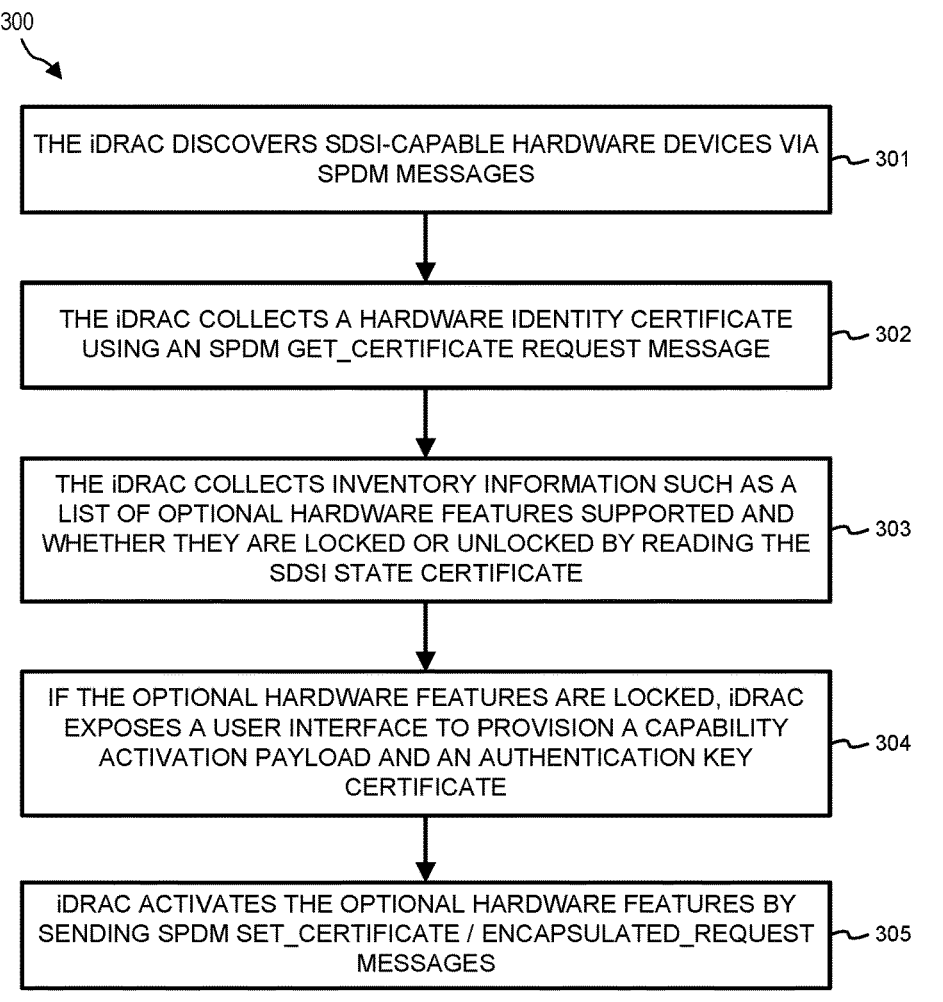

THE iDRAC DISCOVERS SDSI-CAPABLE HARDWARE DEVICES VIA SPDM MESSAGES — 301

THE iDRAC COLLECTS A HARDWARE IDENTITY CERTIFICATE USING AN SPDM GET_CERTIFICATE REQUEST MESSAGE — 302

THE iDRAC COLLECTS INVENTORY INFORMATION SUCH AS A LIST OF OPTIONAL HARDWARE FEATURES SUPPORTED AND WHETHER THEY ARE LOCKED OR UNLOCKED BY READING THE SDSI STATE CERTIFICATE — 303

IF THE OPTIONAL HARDWARE FEATURES ARE LOCKED, iDRAC EXPOSES A USER INTERFACE TO PROVISION A CAPABILITY ACTIVATION PAYLOAD AND AN AUTHENTICATION KEY CERTIFICATE — 304 iDRAC ACTIVATES THE OPTIONAL HARDWARE FEATURES BY SENDING SPDM SET_CERTIFICATE / ENCAPSULATED_REQUEST MESSAGES — 305

FIG. 3

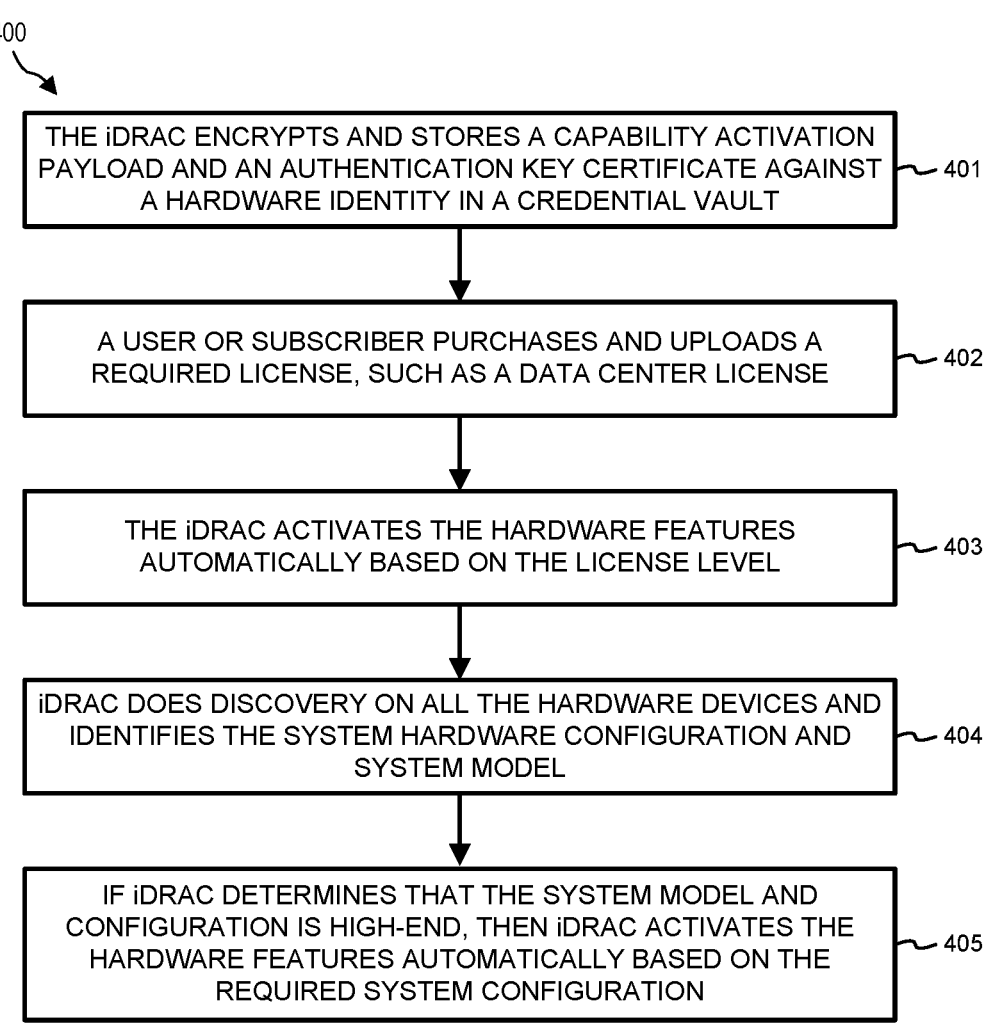

400

THE iDRAC ENCRYPTS AND STORES A CAPABILITY ACTIVATION PAYLOAD AND AN AUTHENTICATION KEY CERTIFICATE AGAINST A HARDWARE IDENTITY IN A CREDENTIAL VAULT — 401

A USER OR SUBSCRIBER PURCHASES AND UPLOADS A REQUIRED LICENSE, SUCH AS A DATA CENTER LICENSE — 402

THE iDRAC ACTIVATES THE HARDWARE FEATURES AUTOMATICALLY BASED ON THE LICENSE LEVEL — 403 iDRAC DOES DISCOVERY ON ALL THE HARDWARE DEVICES AND IDENTIFIES THE SYSTEM HARDWARE CONFIGURATION AND SYSTEM MODEL — 404

IF iDRAC DETERMINES THAT THE SYSTEM MODEL AND CONFIGURATION IS HIGH-END, THEN iDRAC ACTIVATES THE HARDWARE FEATURES AUTOMATICALLY BASED ON THE REQUIRED SYSTEM CONFIGURATION — 405

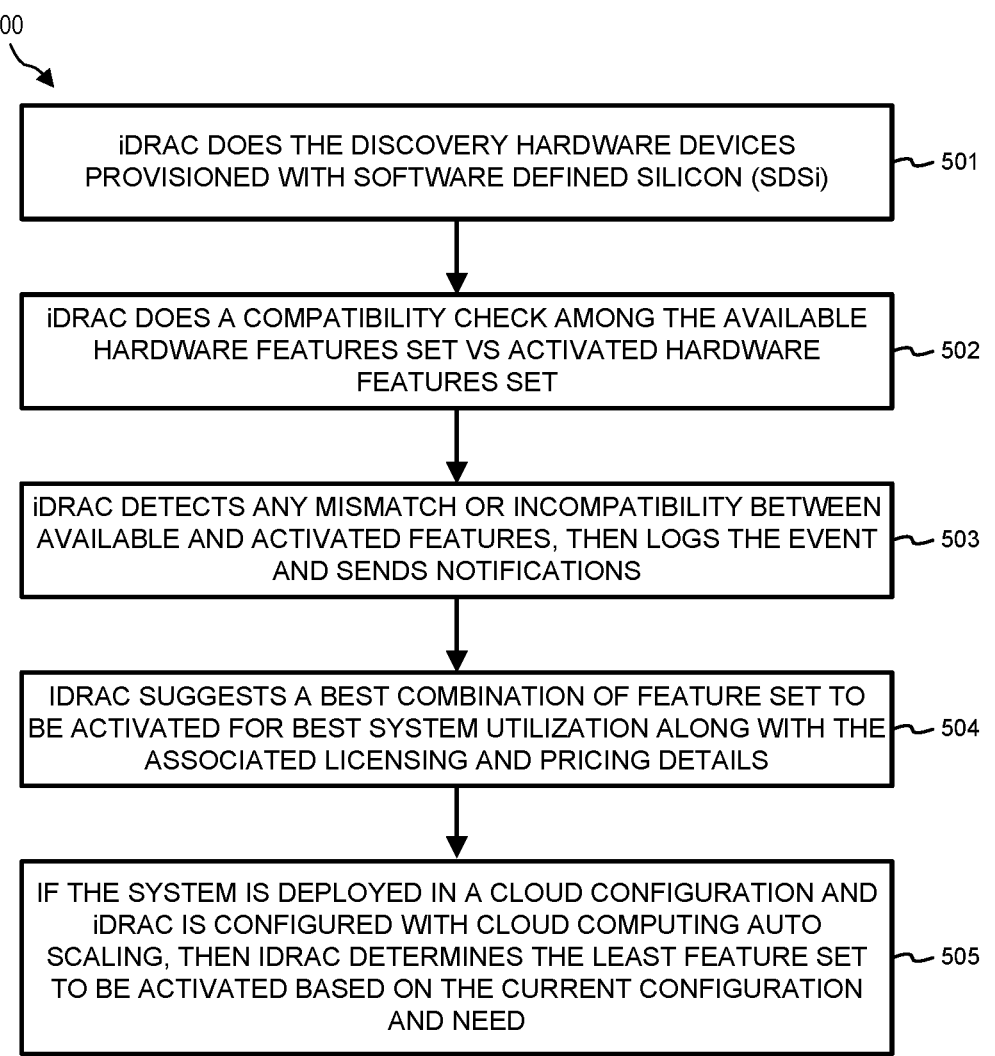

iDRAC DOES THE DISCOVERY HARDWARE DEVICES PROVISIONED WITH SOFTWARE DEFINED SILICON (SDSi) ~ 501 iDRAC DOES A COMPATIBILITY CHECK AMONG THE AVAILABLE HARDWARE FEATURES SET VS ACTIVATED HARDWARE FEATURES SET ~ 502 iDRAC DETECTS ANY MISMATCH OR INCOMPATIBILITY BETWEEN AVAILABLE AND ACTIVATED FEATURES, THEN LOGS THE EVENT AND SENDS NOTIFICATIONS ~ 503

IDRAC SUGGESTS A BEST COMBINATION OF FEATURE SET TO BE ACTIVATED FOR BEST SYSTEM UTILIZATION ALONG WITH THE ASSOCIATED LICENSING AND PRICING DETAILS ~ 504

IF THE SYSTEM IS DEPLOYED IN A CLOUD CONFIGURATION AND iDRAC IS CONFIGURED WITH CLOUD COMPUTING AUTO SCALING, THEN IDRAC DETERMINES THE LEAST FEATURE SET TO BE ACTIVATED BASED ON THE CURRENT CONFIGURATION AND NEED ~ 505

*FIG. 5*

DYNAMIC UNLOCKING OF SOFTWARE DEFINED SILICON (SDSi) PROCESSOR FEATURES VIA SECURITY PROTOCOL DATA MODEL (SPDM)

BACKGROUND

Pay-as-you-go processors, such as the Intel® Xeon® family of processors, which support Intel® On Demand (formerly known as Software Defined Silicon (SDSi), allow for the configuration of optional processor features via a license activation process. This minimizes upfront costs and enables organizations to add new features without a hardware upgrade. To unlock processor features, a data center needs to have an OS kernel driver as well as a user-space application to provision an authentication key certificate and needs to read an SDSi state certificate showing the CPU's configuration state. In current systems, processor features are unlocked by user manually.

SUMMARY

Systems and methods provide for discovery of optional hardware features via Security Protocol and Data Model (SPDM), such as SDSi-capable hardware devices. A capability activation payload and authentication key certificate are provisioned, and then hardware features are activated via SPDM SET_CERTIFICATE and ENCAPSULATED_RE-QUEST messages. A Baseboard Management Controller (BMC) automatically activates the optional hardware features based on the system hardware configuration and license level. The BMC performs a compatibility check among the hardware devices provisioned with SDSi and notifies an administrator if there are mismatches or incompatibility. The BMC may be configured with cloud computing auto scaling, which determines a least feature set to be activated based on a current configuration and need and then provisions the hardware features accordingly.

In one embodiment, an Information Handling System (IHS), comprises an SPDM-enabled device conforming to a SPDM specification. The SPDM-enabled device causes the IHS to identify a device in the IHS having optional hardware features, provision activation data for the optional hardware features, and activate the optional hardware features by sending SPDM messages to the device. The IHS comprises a host processor module configured to host one or more processors, a secure control module configured to host a baseboard management controller, and a secure control interface configured to support communication between the secure control module and the host processor module. The one or more processors have optional hardware features. The one or more processors may be Software Defined Silicon (SDSi) devices.

The baseboard management controller identifies the device having optional hardware features using a SPDM GET_CERTIFICATE request message sent to the devices. The baseboard management controller activates the optional hardware features by sending SPDM SET_CERTIFICATE/ENCAPSULATED_REQUEST messages to the device.

The IHS is configured to expose a user interface to provision activation data for the optional hardware features. The user interface may be a Redfish API. The activation data includes a capability activation payload and an authentication key certificate.

The IHS further comprises a credential vault configured to store a capability activation payload and an authentication key certificate for a selected hardware identity. The IHS is further configured to determine what optional hardware features to activate based upon a data center license and to activate the optional hardware features using the capability activation payload and the authentication key certificate stored in the credential vault.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

FIG. 2 is a block diagram illustrating elements of a data center system.

FIG. 3 is a flowchart illustrating an example process for activating optional hardware features in the system illustrated in FIG. 2.

FIG. 4 is a flowchart illustrating another example process for activating optional hardware features.

FIG. 5 is a flowchart illustrating a further example process for activating optional hardware features.

DETAILED DESCRIPTION

Figure 1:
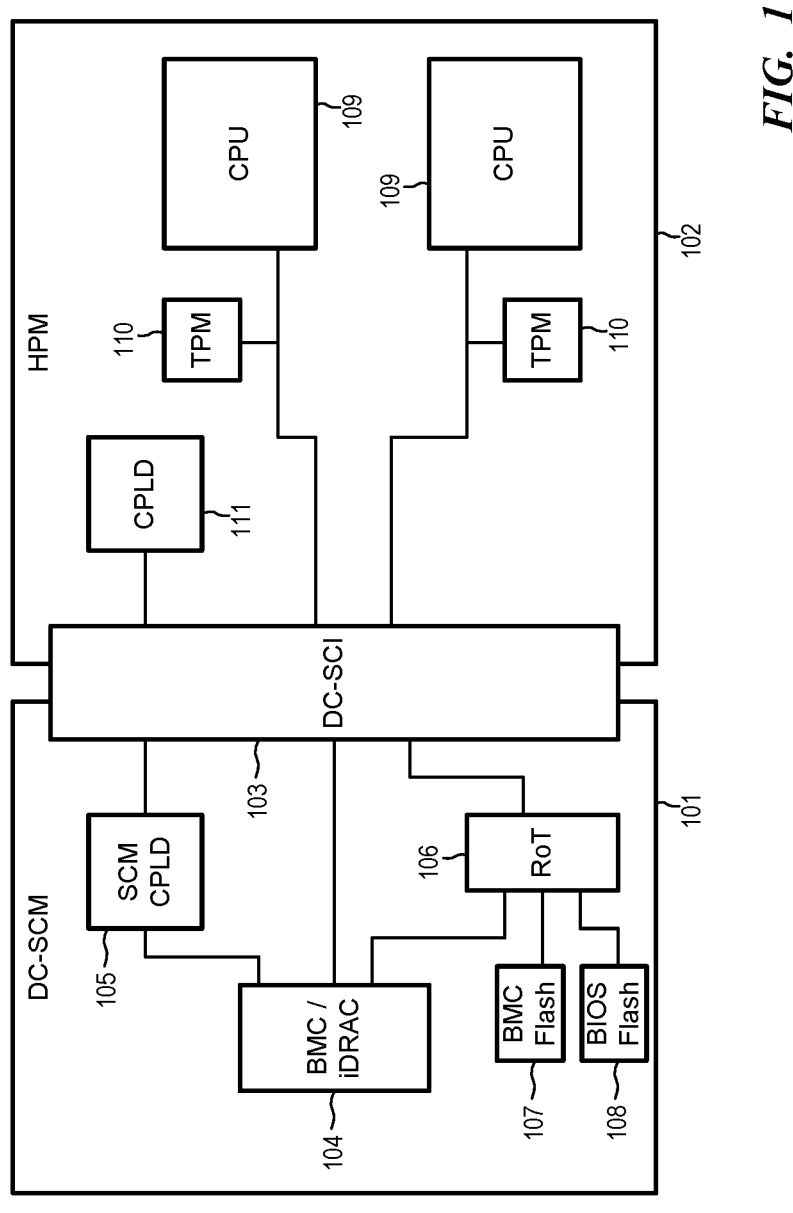
FIG. 1 is a block diagram illustrating multi-node building blocks of a modular hardware system for a data center.

Modular server architectures give cloud service providers a variety of compute choices to meet market and business conditions, to offer flexible configurations, and to deliver innovative solutions. The Datacenter-Modular Hardware System (DC-MHS) provides interoperability between datacenter, edge, and enterprise infrastructure using consistent interfaces and modular building blocks. DC-MHS standardizes various Host Processor Module (HPM) form factors and provides supporting elements for interoperability of HPMs across various platforms. The HPM is managed by a Data-center—Secure Control Module (DC-SCM), which is designed to enable a common management and security infrastructure across platforms within a data center. The interface between the DC-SCM and the HPM is referred as the Datacenter—Secure Control Interface (DC-SCI).

The HPM is a traditional CPU-memory device with the Baseboard Management Controllers (BMC) and security functions moved to the DC-SCM. HPMs are not limited to a standard processor architecture and can apply any processor architecture utilizing management and security features.

FIG. 1 is a block diagram illustrating multi-node building blocks of a DC-MHS. DC-SCM 101 is coupled to HPM 102 via DC-SCI 103. The DC-SCM 101 consists of a BMC 104, which is a specialized service processor that monitors the physical state of the server. As a non-limiting example of a BMC 104, the integrated Dell Remote Access Controller (iDRAC) from DELL, INC. is embedded within DELL® PowerEdge servers and provides functionality that helps information technology (IT) administrators at a remote operations centers deploy, update, monitor, and maintain servers with no need for any additional software to be installed.

A complex programmable logic device (DC-SCM CPLD) 105 contains application specific logic and a high-speed and scalable Low-voltage differential signaling Tunneling Protocol & Interface (LTPI). A Roots of Trust (RoT) Security Processor 106 is responsible for attesting the BMC, BIOS, and/or other firmware images on the system. BMC Flash 107 consists of one or more flash devices used to contain the BMC firmware image. BIOS Flash 108 consist of one or more flash devices used to contain the BIOS firmware image for each node.

HPM 102 represents a general form factor that allows for maximum input/output (I/O) of CPUs 109 in the accessible slots. The HPM 102 form factor does not require a specific CPU 109 or memory technology. Various HPM 102 form factors support different numbers of CPUs. The HPM specifications are adapted to allow multiple generations of compute core designs to fit into the form factor specification so that chassis and system designs can be reused as desired. In one arrangement, CPUs 109 may offer a pay-as-you-go model that allows for activation of certain optional features by purchase of an additional license for selected optional CPU features. The optional features may include, for example, specific accelerators and security technologies that are not required by all customers. The CPUs may be available for purchase with the optional capabilities disabled, and the purchaser (e.g., HPM manufacturer or data center end user) may enable the features at any given time when needed. The Intel On Demand program from Intel Corporation offers Software Defined Silicon (SDSi) CPUs, such as the Xeon® Scalable processor, which allows purchasers to add features to the CPU after purchase.

Trusted Platform Modules (TPM) 110 provide hardware-based, security-related functions for CPUs 109 through integrated cryptographic keys. CPLD 111 supports data exchange between DC-SCM CPLD 105 and HPM 102 using LPTI. In other configurations, HPM 102 may include other hardware components (not shown), such as memory devices, graphics processing units (GPU), peripheral I/O, etc.

DC-MHS provides a family of specifications to enable interoperability between datacenter and enterprise infrastructure by providing consistent interfaces and form factors among modular building blocks. For example, the Open Compute Project® is developing following HPM specifications. The Modular Hardware System FulL Width Specification (M-FLW), which is an HPM form factor specification that is optimized for using the full width of a standard rack-mountable server. The Modular Hardware System Partial Width Density Optimized Specification (M-DNO), which is an HPM specification that is targeted to partial width, such as half-width or three-quarters-width, form factors.

The DC-SCM design simplifies the deployment of HPMs and increases the efficiency for time to market deployment for new systems. The DC-SCM has a standardized pinout and definition, which provides common boot, monitoring, control, and remote debug for diverse platforms.

DC-SCI 103 supports several PCIe bus options between DC-SCM 101 and HPM 102, including PCIe Gen 2.0 up to PCIe Gen 5.0×1 interface, SPI interfaces, NC-SI RMII-based transport (RBT) interface, LTPI, eSPI bus, and I2C/I3C bus among others.

DMTF (formerly known as the Distributed Management Task Force) creates open manageability standards including the Security Protocols and Data Models (SPDM) standard, which enables authentication, attestation, and key exchange to enable and enhance infrastructure security. SPDM defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

Data center administrators require components to establish trust, and to reestablish trust over time, with other components before securely communicating. SPDM provides an authentication mechanism to establish trust between two endpoints. SPDM enables the creation of a session to exchange secured messages between the endpoints. The components may include encompass a number of component types, including PCIe adapters, BMCs, authentication components, CPUs, and components that are attached over I2C or other buses. SPDM enables authentication and secure communication by retrieval of a public key certificate from a component and using a protocol to challenge the component to prove that it is the component whose identity is uniquely described by that certificate. SPDM allows retrieval of a signed measurement payload of mutable components from a component. The measurements may represent a firmware revision, component configuration, the Root of Trust for Measurements, hardware integrity, etc. SPDM provides negotiation of session keys with a component, thereby enabling secured message exchanges with that component.

The Platform Management Components Intercommunication (PMCI) working group of the DMTF prepared the Security Protocol and Data Model (SPDM) Specification (DSP0274) version 1.2.1 dated Jun. 23, 2022 defines messages, data objects, and sequences for performing message exchanges between devices over a variety of transport and physical media. The SPDM Specification sets forth a messaging protocol that defines a request-response messaging model between two endpoints to perform the message exchanges outlined in SPDM message exchanges. The content of the Security Protocol and Data Model (SPDM) Specification (DSP0274) version 1.2.1, including the SPDM message exchanges, are hereby incorporated by reference herein in its entirety.

As noted above, CPUs 109 may offer a pay-as-you-go model that allows a data center using HPM 102 to access optional CPU features. To unlock the optional processor features, the data center administrator needs to have an OS kernel driver as well as a user-space application. The data center administrator must provision an authentication key certificate that is written to internal non-volatile random-access memory (NVRAM), provision a capability activation payload, and read a pay-as-you-go state certificate that shows the configuration state for a given processor. In the Cloud Services Platform (CSP) mode or in the bare metal configuration (i.e., dedicated hardware), current system do not allow unlocking of optional processor features.

Currently, unlocking of optional processor features is performed manually by a user. Existing data centers do not offer auto scaling or auto activation for optional processor features based on a system model or hardware configuration. With the introduction of pay as you go processors, there may be multiple sub systems and hardware devices provisioned with pay-as-you-go optional features. If hardware device features are locked, then interactions between incompatible but capable CPUs need to be notified and provisioned automatically for the best system utilization in a cloud operating environment.

The example embodiments described herein refer to Software Defined Silicon (SDSi) capable hardware devices, such as Intel® Xeon® processors; however, it will be understood that the systems and methods disclosed herein may be used for any hardware devices having optional features that are activated with a license in a pay-as-you-go model.

FIG. 2 is a block diagram illustrating elements of a data center system 200, which may be components of a server or an Information Handling System (IHS), for example. HPM 201 comprises compute elements, such as a CPU 202, memory 203, and other hardware devices 204, such as a graphics processing unit (GPU) or peripherals. CPU 202 is a SDSi-capable processor that includes optional features that are available to a user, such as a data center or a cloud services subscriber, if the user has licensed those optional features. The optional features may be available via a license that requires ongoing fees (i.e., pay-as-you-go or subscription) or a one-time charge. In other embodiments, memory 203 and/or devices 204 may also include optional features that require a license or subscription to activate.

HPM 201 is in communication with DC-SCM 205 via a connector, bus, or interface, such as DC-SCI 206. DC-SCM 205 includes an iDRAC 207 or other remote access controller or baseboard management controller. iDRAC 207 includes SDSi Activation functionality 208, such as a software application or process running on iDRAC 207.

System 200 allows a data center to discover, provision, and activate optional features of hardware, such as SDSi capable CPU 202. As defined in the SPDM Specification, iDRAC 207 may act as a Requester endpoint that sends SPDM messages to other endpoints, such as CPU 202, memory 203, and other devices 204, that act as Responders. A certificate chain is supported by SPDM. The certificate chain contains at least one certificate that includes hardware identity information. The hardware identity information should be present in a device certificate and is identified by a hardware identity object identifier.

FIG. 3 is a flowchart illustrating an example process 300 for activating optional hardware features in the system illustrated in FIG. 2. In step 301, iDRAC 207 discovers the SDSi-capable hardware devices via SPDM messages. For example, iDRAC 207 may send SPDM GET_VERSION and GET_CAPABILITIES request messages to HPM 201 and components 202-204, which reply with corresponding VERSION and CAPABILITIES response messages. In this example, CPU 202 is identified as an SDSi-capable device. In step 302, iDRAC 207 collects a hardware identity certificate for CPU 202 using an SPDM GET_CERTIFICATE request message that is sent to CPU 202. The GET_CERTIFICATE request message identifies a slot to be read on a certificate chain.

In step 303, iDRAC 207 collects the information such as a list of optional hardware features supported by CPU 202 and whether the optional hardware features are locked or unlocked. This information is collected by reading the SDSi state certificate obtained by the SPDM GET_CERTIFICATE request.

In step 304, if the optional hardware features are locked, iDRAC 207 exposes a user interface, such as a Redfish API, to provision a capability activation payload and an authentication key certificate. The capability activation payload and authentication key certificate may be provided by a user or stored in iDRAC 207. In step 305, iDRAC 207 activates the optional hardware features by sending SPDM SET-_CERTIFICATE/ENCAPSULATED_REQUEST messages without any dependency on the host operating system even in a bare metal configuration.

FIG. 4 is a flowchart illustrating another example process 400 for activating optional hardware features in the system illustrated in FIG. 2. In step 401, iDRAC 207 encrypts and stores a capability activation payload and an authentication key certificate against CPU 202's hardware identity in a credential vault. In step 402, a user or subscriber purchases and uploads a required license, such as a data center license.

In step 403, iDRAC 207 activates the optional hardware features automatically based on the license level.

In step 404, iDRAC 207 does discovery on the all the hardware devices, such has HPM 201 and its components, and identifies the system hardware configuration and system model. In step 405, if iDRAC 207 determines that the system model and configuration is high-end (e.g., premium or upscale), then iDRAC 207 activates the optional hardware features automatically based on the required system configuration.

FIG. 5 is a flowchart illustrating a further example process 500 for activating optional hardware features in the system illustrated in FIG. 2. In step 501, iDRAC 207 does discovery on HPM 201 to identify hardware devices provisioned with SDSi, such as CPU 202. In step 502, iDRAC 207 performs a compatibility check among an available hardware features set vs an activated hardware features set for CPU 202. In step 503, if iDRAC 207 detects any mismatch or incompatibility between available and activated features, then iDRAC 207 logs the event, such as in an iDRAC lifecycle log (LCL). iDRAC 207 also sends notifications, which may be sent via Redfish server sent events (SSE), email, or other means. In step 504, iDRAC 207 suggests a best combination of the feature set to be activated for the best system utilization along with the associated licensing and pricing details.

In step 505, if the system is deployed in a cloud configuration, and if iDRAC 207 is configured with cloud computing auto scaling, then iDRAC 207 determines the least feature set to be activated based on the current configuration and need. In step 506, iDRAC 207 activates the required hardware features by provisioning the capability activation payload and the authentication key certificate via SPDM SET_CERTIFICATE/ENCAPSULATED_REQUEST messages.

In one arrangement, a server or IHS comprises an SPDM-enabled device conforming to a SPDM specification, wherein the SPDM-enabled device comprises at least one processor coupled to at least one memory, the at least one memory having program instructions stored thereon. Upon execution by the at least one processor, the program instructions cause the IHS to identify a device in the IHS having optional hardware features, provision activation data for the optional hardware features, and activate the optional hardware features by sending SPDM messages to the device. The IHS further comprises a host processor module configured to host one or more processors, a secure control module configured to host a baseboard management controller, and a secure control interface configured to support communication between the secure control module and the host processor module. The one or more processors are devices that have optional hardware features. The one or more processors may be SDSi devices.

The baseboard management controller identifies the device having optional hardware features using a SPDM GET_CERTIFICATE request message sent to the devices. The baseboard management controller activates the optional hardware features by sending SPDM SET_CERTIFICATE/ ENCAPSULATED_REQUEST messages to the device. The IHS is configured to expose a user interface to provision activation data for the optional hardware features. The user interface is a Redfish API. The activation data includes a capability activation payload and an authentication key certificate.

The IHS further comprises a credential vault configured to store a capability activation payload and an authentication key certificate for a selected hardware identity. The IHS is further configured to determine what optional hardware features to activate based upon a data center license, and activate the optional hardware features using the capability activation payload and the authentication key certificate stored in the credential vault.

In another arrangement, a method for unlocking optional hardware features comprises discovering hardware devices with optional features via SPDM messages sent by a baseboard management controller, identifying optional features that are locked on the hardware devices, exposing a user interface to provision a capability activation payload and an authentication key certificate for the optional features, and activating the optional features using the capability activation payload and the authentication key certificate by sending SPDM messages to the hardware devices. The baseboard management controller sends SPDM GET_VERSION and GET_CAPABILITIES request messages to discover hardware devices with optional features. The locked optional features are identified from a hardware identity certificate obtained using an SPDM GET_CERTIFICATE request message. The optional features are activated by sending SPDM SET_CERTIFICATE/ENCAPSULATED_REQUEST messages to the hardware device.

The method further comprises storing the capability activation payload and the authentication key certificate for a hardware identity in a credential vault. The method further comprises identifying a system hardware configuration for the IHS, and activating the optional features automatically based on the system hardware configuration using the capability activation payload and the authentication key certificate stored in the credential vault.

The method further comprises performing a compatibility check between available hardware features and activated hardware features in the IHS, identifying mismatches between available and activated hardware features, and suggesting, to an IHS user, a proposed combination of hardware features to be activated for best system utilization.

The method further comprises identifying available optional hardware features in the IHS, and determining a least feature set of optional features to be activated based on a current IHS configuration.

The method further comprises activating optional hardware features required by a current IHS license by provisioning the capability activation payload and the authentication key certificate via SPDM SET_CERTIFICATE/ENCAPSULATED_REQUEST messages.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An Information Handling System (IHS), comprising:
a Security Protocol and Data Model (SPDM)-enabled device in conformance to a SPDM specification, wherein the SPDM-enabled device comprises at least one processor coupled to at least one memory, the at least one memory configured with program instructions stored thereon that, upon execution by the at least one processor, cause the IHS to:
identify a Software Defined Silicon (SDSi) device in the IHS configured with optional hardware features based at least in part on an encrypted capability activation payload and authentication certificate indexed against a hardware identity of the SPDM-enabled device;
provision activation data for the optional hardware features, wherein the activation data includes a capability activation payload and an authentication key certificate; and
activate the optional hardware features by sending SPDM messages to the SDSi device.

2. The IHS of claim 1, further comprising:
a host processor module configured to host one or more processors;
a secure control module configured to host a baseboard management controller; and
a secure control interface configured to support communication between the secure control module and the host processor module.

3. The IHS of claim 1, wherein the IHS is configured to expose a user interface to provision activation data for the optional hardware features.

4. The IHS of claim 1, wherein the IHS further comprises:
a credential vault configured to store the capability activation payload and authentication key certificate for a selected device hardware identity.

5. The IHS of claim 2, wherein the one or more processors are SDSi devices that have optional hardware features.

6. The IHS of claim 2, wherein the baseboard management controller is configured to identify the SDSi device with optional hardware features based at least in part on a SPDM GET_CERTIFICATE request message sent to the device.

7. The IHS of claim 2, wherein the baseboard management controller activates the optional hardware features by sending SPDM SET_CERTIFICATE/ENCAPSULATED_REQUEST messages to the SDSi device.

8. The IHS of claim 3, wherein the user interface is a Redfish API.

9. The IHS of claim 4, wherein the IHS is further configured to:

determine what optional hardware features to activate based upon a data center license; and activate the optional hardware features using the capability activation payload and the authentication key certificate stored in the credential vault.

10. A method for unlocking optional hardware features for an Information Handling System (IHS), the method comprising:

discovering Software Defined Silicon (SDSi) hardware devices with optional features via Security Protocol and Data Model (SPDM) messages sent by a baseboard management controller;

identifying optional features that are locked on the SDSi hardware devices, based at least in part on at least one encrypted capability activation payload and authentication certificate indexed against at least one respective identity of the SDSi hardware devices;

exposing a user interface to provision a capability activation payload and an authentication key certificate for the optional features; and activating the optional features using the capability activation payload and the authentication key certificate by sending SPDM messages to the SDSi hardware devices.

11. The method of claim 10, wherein the baseboard management controller sends SPDM GET_VERSION and GET_CAPABILITIES request messages to discover SDSi hardware devices with optional features.

12. The method of claim 10, wherein locked optional features are identified from a hardware identity certificate obtained using an SPDM GET_CERTIFICATE request message.

13. The method of claim 10, wherein the optional features are activated by sending SPDM SET_CERTIFICATE/EN-CAPSULATED_REQUEST messages to the SDSi hardware device.

14. The method of claim 10, further comprising:

encrypting and storing the at least one capability activation payload and authentication key certificate indexed against the at least one respective identity of the SDSi hardware devices in a credential vault.

15. The method of claim 10, further comprising:

performing a compatibility check between available hardware features and activated hardware features in the IHS;

identifying mismatches between available and activated hardware features; and suggesting, to an IHS user, a proposed combination of hardware features to be activated for best system utilization.

16. The method of claim 10, further comprising:

identifying available optional hardware features in the IHS; and determining a least feature set of optional features to be activated based on a current IHS configuration.

17. The method of claim 10, further comprising:

activating optional hardware features required by a current IHS license by provisioning the capability activation payload and the authentication key certificate via SPDM SET_CERTIFICATE/ENCAPSULATED_RE-QUEST messages.

18. The method of claim 14, further comprising:

identifying a system hardware configuration for the IHS; and activating the optional features automatically based on the system hardware configuration using the capability activation payload and the authentication key certificate stored in the credential vault.

\* \* \* \* \*